US011573793B2

(12) United States Patent
Kasture et al.

(10) Patent No.: US 11,573,793 B2
(45) Date of Patent: Feb. 7, 2023

(54) LAZY PUSH STRATEGIES FOR VECTORIZED D-HEAPS

(71) Applicant: Oracle International Corporation, Redwood Shores, CA (US)

(72) Inventors: Harshad Kasture, Sunnyvale, CA (US); Matthias Brantner, Sunnyvale, CA (US); Hassan Chafi, San Mateo, CA (US); Benjamin Schlegel, Merced, CA (US); Pit Fender, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 252 days.

(21) Appl. No.: 16/822,009

(22) Filed: Mar. 18, 2020

(65) Prior Publication Data

US 2021/0294603 A1    Sep. 23, 2021

(51) Int. Cl.
*G06F 17/00* (2019.01)
*G06F 9/30* (2018.01)
*G06F 9/38* (2018.01)
*G06F 15/80* (2006.01)

(52) U.S. Cl.
CPC .......... *G06F 9/3004* (2013.01); *G06F 9/3887* (2013.01); *G06F 15/8061* (2013.01)

(58) Field of Classification Search
CPC .. G06F 9/3004; G06F 9/3887; G06F 15/8061; G06F 16/23
USPC ........................................................ 707/756
See application file for complete search history.

(56) References Cited

U.S. PATENT DOCUMENTS

| 5,287,494 A | 2/1994 | Garcia |
| 5,850,538 A | 12/1998 | Steinman |
| 6,259,988 B1 | 7/2001 | Galkowski et al. |
| 6,952,696 B1 | 10/2005 | Nadj |
| 8,387,057 B2 | 2/2013 | Wilmarth |
| 2011/0060748 A1* | 3/2011 | Tian .......................... G06F 7/24 707/752 |
| 2011/0219204 A1 | 9/2011 | Caspole |
| 2012/0102284 A1* | 4/2012 | Odaira .................. G06F 9/4493 711/E12.098 |
| 2012/0222005 A1 | 8/2012 | Harris |
| 2015/0178375 A1 | 6/2015 | Ishizaki |
| 2015/0309846 A1 | 10/2015 | Prasad |
| 2019/0087600 A1* | 3/2019 | Sion ...................... H04L 9/0891 |

(Continued)

OTHER PUBLICATIONS

Knuth et al. "The Art of Computer Programming", vol. 3: (2Nd Ed.) Sorting and Searching, 2 parts, AddisonWesley Longman Publishing Co., Inc., Redwood City, CA, USA, dated 1998, 1061 pages.

(Continued)

*Primary Examiner* — Don N Vo
(74) *Attorney, Agent, or Firm* — Hickman Becker Bingham Ledesma LLP

(57) ABSTRACT

Techniques are provided for lazy push optimization, allowing for constant time push operations. A d-heap is used as the underlying data structure for indexing values being inserted. The d-heap is vectorized by storing values in a contiguous memory array. Heapify operations are delayed until a retrieve operation occurs, improving insert performance of vectorized d-heaps that use horizontal aggregation SIMD instructions at the cost of slightly lower retrieve performance.

20 Claims, 11 Drawing Sheets

(56) References Cited

U.S. PATENT DOCUMENTS

| | | | |
|---|---|---|---|
| 2019/0354471 A1* | 11/2019 | Yoshimura | G06F 12/0223 |
| 2020/0097288 A1 | 3/2020 | Schlegel | |
| 2020/0293332 A1 | 9/2020 | Schlegel | |
| 2020/0348933 A1 | 11/2020 | Schlegel | |
| 2021/0232402 A1 | 7/2021 | Schlegel | |

OTHER PUBLICATIONS

Edelkamp, et al., "Strengthened Lazy Heaps: Sur-passing the Lower Bounds for Binary Heaps", dated 2014. 14 pages.

Chowdhury et al. "Cache-oblivious Shortest Paths in Graphs Using Buffer Heap". Dated Jun. 2004, 11 pages.

Arge et al. "The Buffer Tree: A New Technique for Optimal i/o-algorithms", In Data Structures, dated Aug. 1996, 37 pages.

Schlegel, U.S. Appl. No. 16/299,483, filed Mar. 12, 2019, Office Action, dated Jun. 22, 2020.

Schlegel et al., U.S. Appl. No. 16/399,226, filed Apr. 30, 2019, Non-Final Office Action, dated Jan. 18, 2022.

Schlegel, U.S. Appl. No. 16/139,226, filed Sep. 24, 2018, Office Action, dated Oct. 7, 2020.

Fadel et al. "Heaps and Heapsort on Secondary Storage", Theor. Computer Science 220, 2 dated Jun. 17, 1999, pp. 345-362.

Tridgell et al., "An Implementation of a General-Purpose Parallel Sorting Algorithm", Computer Sciences Laboratory Australian National University, dated 1993, 24 pages.

Hunt et al., "An Efficient Algorithm for Concurrent Priority Queue Heaps", dated 1996, 7 pages.

Futak et al., "Using SIMD Registers and Instructions to Enable Instruction-level Parallelism in Sorting Algorithms", Acm Symposium on Paralleslism in Algorithms and Architectures dated 2007, 10 pgs.

Deo et al., "Parallel Heap: An optimal Parallel Priority Queue", dated 1992, 12 pages.

Schlegel, U.S. Appl. No. 16/139,226, filed Sep. 24, 2018, Corrected Notice of Allowability, dated Oct. 14, 2021.

Khuong et al., Heapsort: More Comparisons, Less Memory Traffic. dated Apr. 2014, 34 pages.

Bramas. "Fast Sorting Algorithms Using AVX-512 on Intel Knights Landing" CoRR, abs/1704.08579, 2017a. URL http://arxiv.org/abs/1704.08579, dated 2017, 17 pages.

Fadel et al., ". Heaps and Heapsort on Secondary Storage", Theor. Comput. Sci., 220(2):345-362, dated Jun. 1999. ISSN 0304-3975, 18 pages. Furtak et al., "Using SIMD Registers and Instructions to Enable Instruction-Level Parallelism in Sorting Algorithms", ACM Symposium on Parallel Algorithms and Architectures, dated 2007, 10 pages.

Gedik et al., Cellsort: High Performance Sorting on the Cell Processor, In Proceedings of the 33rd International Conference on Very Large Data Bases, VLDB '07, VLDB Endowment, 2007, 12 pages.

H. Inoue and K. Taura. "Simd- and Cache-friendly Algorithm for Sorting an Array of Structures", Proc. VLDB Endow., dated Jul. 2015. ISSN 2150-8097, 12 pages.

Bramas. "A Novel Hybrid Quicksort Algorithm Vectorized Using AVX-512 on Intel Skylake", International Journal of Advanced Computer Science and Applications (IJACSA), Nov. 2017, 9 pages.

J. Chhugani et al., ". Efficient implementation of Sorting on Multi-Core Simd Cpu Architecture", Proc. VLDB Endow., 1(2):1313{1324, datged Aug. 2008. ISSN 2150-8097, 12 pages.

Zhou et al., "Implementing Database Operations Using SIMD Instructions", Proceedings of the ACM Sigmod International Conference on Management of Data, dated Jun. 3, 2002, pp. 145-156.

LaMarca et al., "The Influence of Caches on the Performance of Heaps", dated Jan. 1, 1996, 26 pages.

Liu et al., "Ad-Heap", General Purpose Processing Using GPUS, ACM, 2 Penn Plaza 701 New Yorkm NY, USA, dated Mar. 1, 2014, pp. 54-63.

Liu et al., "ad-heap: an Efficient Heap Data Structure for Asymmetric Multicore Processors", In Proceedings of Workshop on General Purpose Processing Using GPUs, ACM, dated 2014, 10 pages.

Satish et al., Fast Sort On Cpus, Gpus and Intel Mic Architectures, Intel, 11 pages.

Wegner et al., "The External Heapsort". IEEE Trans. Softw. Eng., dated Jul. 1989. ISSN 0098-5589, 9 pages.

Xiaochen et al, "Register Level Sort Algorithm on Multi-core Simd Processors", In Proceedings of the 3rd Workshop on Irregular Applications: Architectures and Algorithms, IA3, dated 2013, 8 pages.

Harada and L. Howes. Introduction to gpu radix sort. Dated 2011, 3 pages.

Liu et al., "Ad-heap: An efficient heap data structure for asymmetric multicore processors," Proceedings of Workshop on General Purpose Processing Using GPUs, 2014, pp. 54-63.

Garcia-Vazquez et al., "D-Heaps as hash tables for vectors over a finite ring," 2009 WRI World Congress on Computer Science and Information Engineering, vol. 3, IEEE, 2009, pp. 162-166.

Furtak, "Sorting Using SIMD Registers," 2007, 95 pages.

Furtak et al., "Using SIMD registers and instructions to enable instruction-level parallelism in sorting algorithms," Proceedings of the nineteenth annual ACM symposium on Parallel algorithms and architectures, 2007, pp. 348-357.

Adams, "Exploration Into The Performance Of Asymmetric D-Ary Heap-Based Algorithms For The Hsa Architecture," 2014, 95 pages.

Schlegel, U.S. Appl. No. 16/299,483, filed Mar. 12, 2019, Advisory Action, dated Dec. 30, 2020.

Schlegel et al., "Patent Proposal: Lazy push strategies for vectorized d-heaps", Nov. 12, 2019, pp. 1-22.

Schlegel, U.S. Appl. No. 17/227,167, filed Apr. 9, 2021, Notice of Allowance and Fees Due, dated Jul. 11, 2022.

Schlegel, U.S. Appl. No. 16/399,226, filed Apr. 30, 2019, Notice of Allowance and Fees Due, dated May 3, 2022.

Schlegel, U.S. Appl. No. 17/227,167, filed Apr. 9, 2021, Notice of Allowance and Fees Due dated Aug. 12, 2022.

* cited by examiner

//Push operations

| | Node A | | | Node B | | | Node C | | | | | |
|---|---|---|---|---|---|---|---|---|---|---|---|---|
| → | 12 | 34 | 7 | 67 | 4 | 100 | 43 | 41 | 26 | 86 | 84 | 42 | ← |

//Retrieve operation

| | | | | | | | | | | | | | → | 42 | ← |
|---|---|---|---|---|---|---|---|---|---|---|---|---|---|---|---|
| 100 | 86 | 7 | 67 | 4 | 12 | 43 | 41 | 26 | 34 | 84 | 42 | | | | |

//Push operations

| | Node A | | | Node B | | | Node C | | | | → | Node D | | | Node E | | | |
|---|---|---|---|---|---|---|---|---|---|---|---|---|---|---|---|---|---|---|---|
| 100 | 86 | 123 | 67 | 4 | 12 | 43 | 41 | 26 | 34 | 84 | 42 | 52 | 53 | 72 | 123 | 1 | 37 | 44 | 51 | ← |

//Retrieve operation

| | | | | | | | | | | | | | | | | | | → | 51 | ← |
|---|---|---|---|---|---|---|---|---|---|---|---|---|---|---|---|---|---|---|---|---|
| 100 | 86 | 123 | 67 | 4 | 12 | 43 | 41 | 26 | 34 | 84 | 42 | 52 | 53 | 72 | 7 | 1 | 37 | 44 | 51 | |

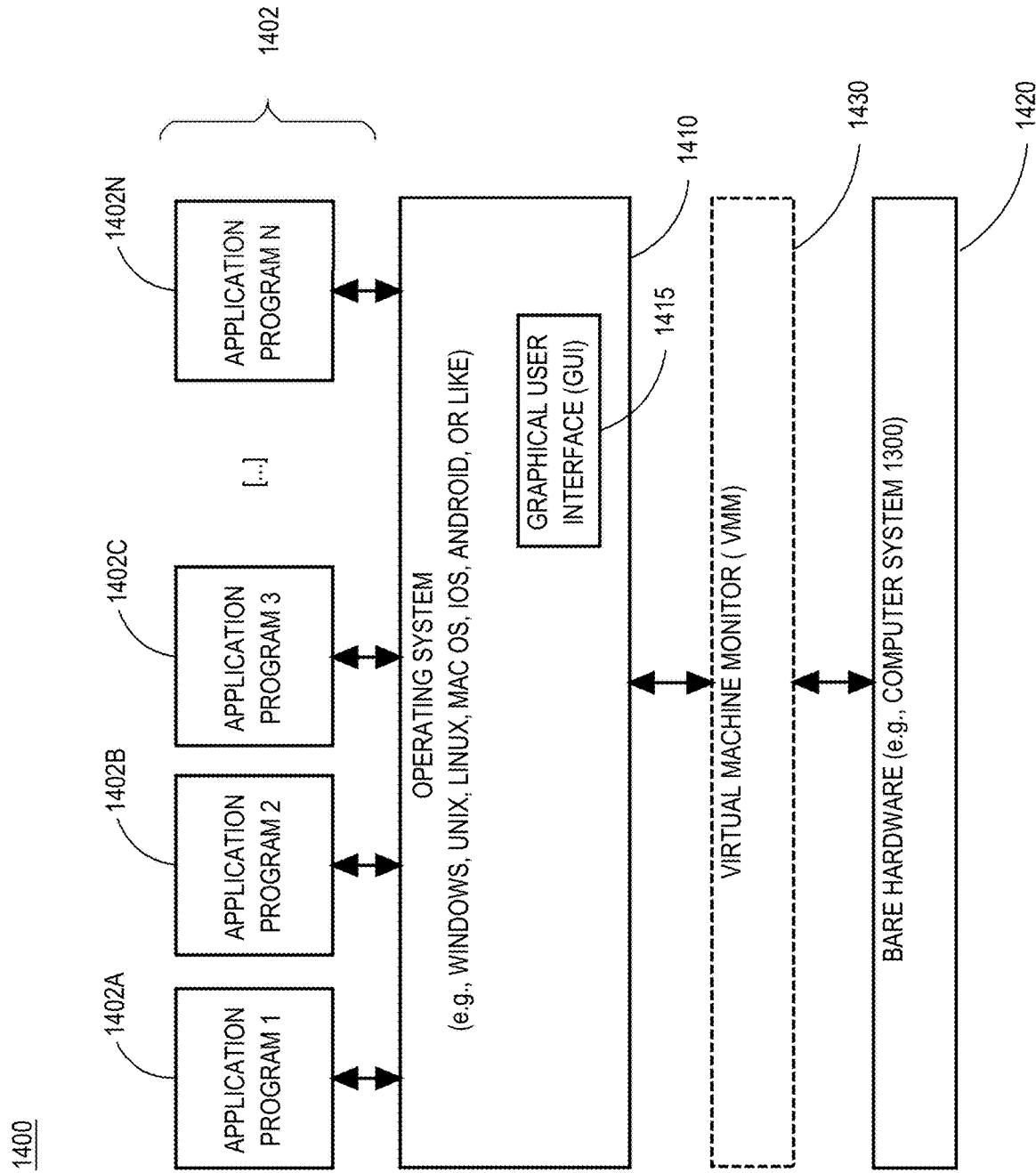

LAZY PUSH STRATEGIES FOR VECTORIZED D-HEAPS

CROSS-REFERENCE TO RELATED APPLICATIONS

This application is related to co-pending U.S. patent application Ser. No. 16/139,226, filed on Sep. 24, 2018, entitled "Method for Vectorizing D-Heaps using Horizontal Aggregation SIMD Instructions," co-pending U.S. patent application Ser. No. 16/299,483, filed on Mar. 12, 2019, entitled "Method for Vectorizing Heapsort using Horizontal Aggregation SIMD Instructions," and co-pending U.S. patent application Ser. No. 16/399,226, filed on Apr. 30, 2019, entitled "Method for Generic Vectorized D-Heaps," wherein all have a common assignee and wherein the entire contents of which are hereby incorporated by reference as if fully set forth herein.

FIELD OF THE INVENTION

The present disclosure relates to maintaining data structures and, more particularly, inserting of data in data structures.

BACKGROUND

A good insert performance into a heap is crucial in many applications where not all keys that have been inserted into a heap are retrieved during its lifetime. For example, shortest path graph algorithms often insert much more keys into the heap than they retrieve because they stop retrieving keys as soon as the shortest path is found.

A single insert accesses values from different nodes on a path from a last node to a root node of the heap. Gather instructions may improve insert performance; however, the performance improvements are very limited since these instructions require much more cycles compared to regular load instructions. An approach based on gather instructions would further always load all values along the path from the last node to the root node, while many of these values are not needed in most cases. For example, a newly inserted value is correctly placed in the last node and does not need to move up.

Discussed herein are approaches for improving insert performance of vectorized d-heaps and providing a vectorized full or partial building of the vectorized d-heap.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 10D illustrates an example depicting lazy push for a vectorized d-heap in an embodiment of the invention.

FIG. 14 illustrates a diagram depicting a software system upon which an embodiment of the invention may be implemented.

DETAILED DESCRIPTION

Figures 1, 2:
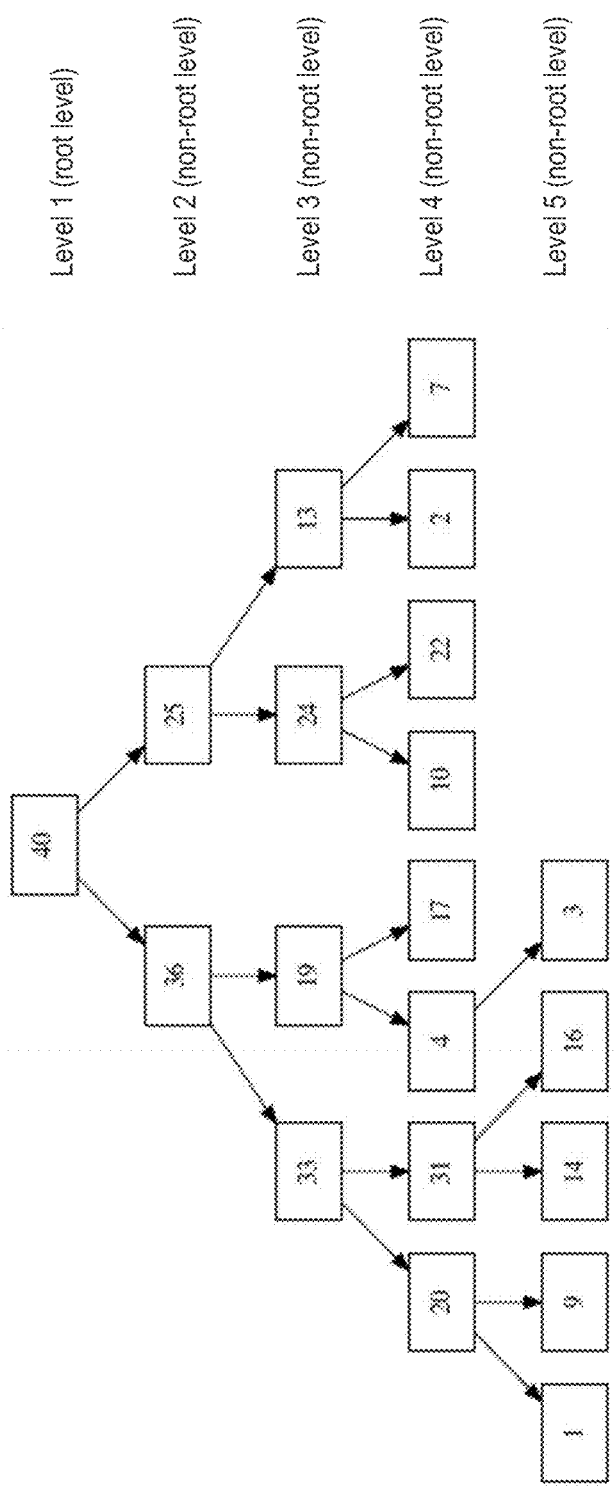
FIG. 1 illustrates a binary max-heap.
FIG. 2 illustrates an implicit binary heap corresponding to the binary heap of FIG. 1.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Heap Overview

A heap data structures is one of the most important fundamental data structures in computer science. Its key features are: (1) adding and removing a single element in logarithmic time and (2) finding the smallest or largest element (also called top element) of its indexed elements in constant time. Whether the smallest or largest element is returned depends on the type of the heap. A max-heap always returns the largest of its indexed elements, while a min-heap always returns the smallest of its indexed elements. Although custom predicates that define an order are also possible, min and max heaps are most common types of heaps.

Many graph algorithms (e.g., k-nearest neighbor, minimum spanning tree, weighted shortest path) rely on efficient priority queues (or heaps) that have a high insert performance because the time spent for heap operations amounts for a significant fraction of their overall runtime. Hence, improving the insert performance of priority queues is crucial in order to have fast graph algorithms. Most applications use existing heap implementations from various libraries. For example, the priority_queue, PriorityQueue, and heapq are heap implementations in C++, Java, and Python, respectively.

A heap implementation may have, besides constructor and destructor, five functions/methods. The push( ) method adds a single new element to the heap while pop( ) accordingly removes a single element from the heap. The top( ) method returns the top value of the heap. The size( ) method returns the number of elements stored in the heap while empty( ) returns true if the heap has zero elements and otherwise false.

Binary Heap Overview

There are various types of heaps and underlying storage representations. The most commonly used heap is a binary heap. It uses a binary tree to index its elements. The values stored in the tree are arranged in a way that they fulfill the heap property. The heap property is fulfilled when each node of the tree has a value that is smaller or equal (min-heap) or larger or equal (max-heap) than any of the values of its child nodes.

The heap's underlying binary tree is usually a complete tree. All of its levels except the last level are completely filled and the nodes in the last level, if not fully filled, are as far left as possible.

Accessing the top element of the heap (e.g., using the top( ) method) is a constant time operation since this element is stored in the top node of the underlying binary tree. Adding or removing an element to and from the heap is a logarithmic time operation because the nodes' values within one path from the top node and a leaf node might need to be switched to restore the heap property. The length of the path is determined by the height h of the tree (e.g., number of tree levels). It is given by $h=\log_2(n+1)$, where n denotes the number of elements in the heap. Hence, up to h comparisons are required to restore the heap property in a binary heap containing n elements when a new element is added or an element is removed.

FIG. 1 illustrates a binary max-heap, which contains 20 values. The largest of its values is 40 and is located in the tree's root node. All of its child nodes have smaller values. The heap has 5 tree levels (or a height of 5), which means that up to 5 comparisons are needed to insert a new value into the heap and restore the heap property.

The physical representation of the heap's underlying tree can either be a pointer-based or an implicit data structure without any pointer. Implicit binary heaps store all of the heap's values in a single array. Since there is no need to a store pointer, implicit heaps are more space-efficient than pointer-based heaps. The position of a value within the heap's array can be used to calculate its position, e.g., its parent node and child nodes, in the logical binary tree that is represented by the array. The first position of the array represents the top element or root node of the logical tree. The two children of the root node (e.g., the two nodes within the second level of the tree) are stored at position 2 and 3. Their child nodes are stored thereafter at position 4, 5, 6, and 7. Put differently, the nodes of one level are stored directly behind the nodes that form the level above them within the array. In a 0-based array, the two child nodes of a value at position p are stored at the positions p·2+1 and p·2+2. Similarly, the parent node of a value stored at position p is found at $(p-1)/2$.

FIG. 2 illustrates an implicit binary heap, which stores the same values as the binary heap illustrated in FIG. 1. The heap's tree has 5 levels with each, except for the last, level fully filled with values. The top value 40 is stored at the first position of the array. The values of its child nodes 36 and 25 are stored at position 2 and 3. The nodes of all other levels are stored, always in a consecutive range, thereafter in the array.

D-Heap Overview

A d-heap is a cache-friendly version of the binary heap. It uses an n-ary tree, with n=d to index its values. Each tree node contains d values and has up to d successors. The d values within a node are unordered. Each of the node's values might have a child node assigned in which all values are larger (min-heap) or smaller (max-heap) than the value, fulling the heap property. Hence, not all values of a node are necessarily larger (or smaller) than all values of its child nodes. In other words, the heap property of the d-heap is fulfilled when each value at the parent node is larger (or smaller) than all values at its respective child node.

The 2-heap is not the same as a binary heap. Although each node has two children, a 2-heap's node contains 2 values instead of one as for the binary heap.

Accessing the top value in a d-heap is a constant time operation, however, d comparisons are needed to find the top value within the root node. Adding or removing a value is a logarithmic time operation. However, the logarithmic base is roughly d instead of 2 as for the binary heap, because the numbers of levels in the d-heap's underlying tree is $[\log_d (d-1)+\log_d(n+1)-1]$, where n denotes the number of values in the heap.

Table 1 illustrates the worst-case number of comparisons in a binary heap, 2-heap, 4-heap, and 8-heap that are required for push( ) and pop( ) when the heap has 32, 1000, 32,000, and 1,000,000 values. The height of the 4-heap's tree is for the same number of values only about half compared to the binary heap's tree. The average height of the 8-heap's tree is even only one-third of the binary heap's tree. The number of tree levels differ by exactly one for the binary heap and the 2-heap. Although the nodes in both heaps have the same number of children, each node in the 2-heap stores two values.

TABLE 1

| Comparisons for push( ) and pop( ) in a binary heap, 2-heap, 4-heap and 8-heap | | | | |
| --- | --- | --- | --- | --- |
| Values | Binary Heap | 2-Heap | 4-Heap | 8-Heap |
| 32 | 6 | 5 | 3 | 2 |
| 1k | 10 | 9 | 5 | 4 |
| 32k | 15 | 14 | 8 | 5 |
| 1M | 20 | 19 | 10 | 7 |

The d-heap's underlying tree is a complete tree. All levels except the last are completely filled. If the last level is not complete, then the nodes are as far left as possible. Furthermore, only the most right of the last level nodes might have fewer than d values.

Figures 3, 4:
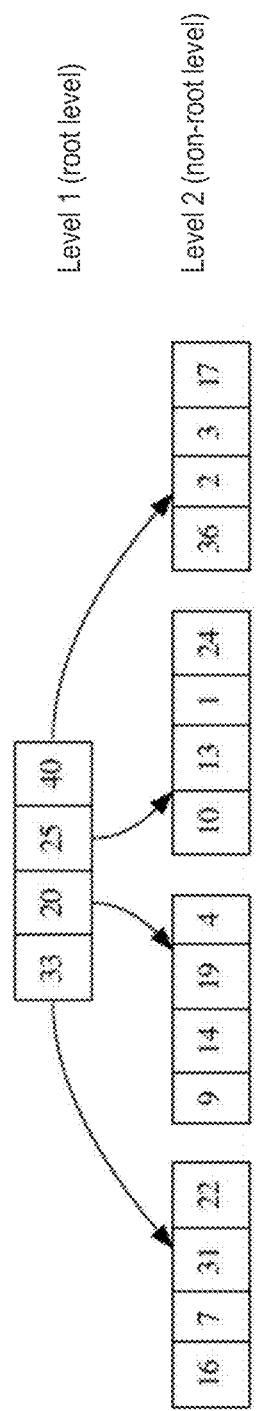
FIG. 3 shows a 4-heap.
FIG. 4 illustrates an implicit 4-heap corresponding to the 4-heap of FIG. 3.

FIG. 3 shows a 4-heap that contains the same 20 values that were pushed into the binary heap shown in FIG. 2. Contrary to the binary heap, the 4-heap has only two tree levels so that only two comparisons are needed to push a new value into the heap. The root node does not contain the four largest of all 20 values. The values 31 and 36 are stored in the second level but still the heap property is not violated since they are both not larger than their assigned parent node's value.

The d-heap's physical representation of its underlying tree can either be a pointer-based or an implicit data structure. The implicit d-heap stores all of its values in a single array and has the same memory requirements as an implicit binary heap. The pointer-based d-heap is more space efficient than the pointer-based binary heap for d=2, as in the d-heap, d values in a node share a single pointer from the parent node while the binary heap requires a pointer for every value in the heap.

All values of a single node are always stored consecutively in the array. Similar to the binary heap, all nodes of the same tree level are stored consecutively, e.g., the array starts with the d values of the d-heap's root node, followed by the $d^2$ values of the second tree level, and so forth. In a 0-based array, the d child values of a value at position p are stored beginning from position $(p+1) \cdot d$. The parent of a value at position p is stored at position $p/d-1$.

FIG. 4 illustrates an implicit 4-heap, which corresponds to the 4-heap shown in FIG. 3. The first four values of the array form the root node of the logical 4-ary tree. All other values are stored thereafter and form the four leaf nodes that are part of the second level in the tree.

The implicit d-heap has several advantages over the implicit binary heap. It is considered as more cache efficient than the binary heap, because all keys of a single node are likely within the same cacheline. Higher cache efficiency significantly improves performance of larger heaps that do not fully fit into the caches anymore. Depending on the value of d, the d-heap has, for the same amount of values, fewer levels in its underlying tree compared to a binary heap. Less tree levels improve the performance of push operations because fewer comparisons are needed to restore the heap property when a new value is inserted into the heap. However, the pop and top operation are more expensive because multiple comparisons are needed to find the smallest (min heap) or largest value (max heap) within a node, e.g., the top operation in a binary heap just has to return the top element so that there is no comparison needed for this operation. The binary heap's advantage for faster pop operations disappears for large heaps because of binary heap's bad cache utilization.

SIMD Overview

Single Instruction, Multiple Data (SIMD) architectures exist to allow computers with multiple processing elements to simultaneously perform the same operation on multiple data points. SIMD architectures may perform mainly "vertical" operations where corresponding elements in separate operands are operated upon in parallel and independently.

Unlike traditional vertical SIMD instructions, horizontal SIMD instructions are performed across the elements of a SIMD register. Horizontal aggregation SIMD instructions possess a subclass of horizontal aggregation SIMD instructions that aggregate the values of a single vector allowing the maximum and minimum key value in a register to be located.

SIMD instructions allow the execution alignment of the same operation on multiple data elements at once. In one embodiment, the key values stored in d-slots of the heap are vectorized and aligned so that horizontal SIMD instructions are applied on the plurality of nodes in order to perform retrieval operations to find the minimum and maximum value within a node of the heap.

Vectorized D-Heap Overview

Retrieval operations against a d-heap is improved by vectorizing the d-heap and utilizing horizontal aggregation SIMD instructions across the retrieval operations. A memory is contiguous (within an address space) and contains an array of slots that form a beginning-most space and an end-most space in the array. The d-heap contains a plurality of nodes. Each of the plurality of nodes comprises d slots, wherein each of the d slots store a key value of d key values, where each slot is an element of the array. The plurality of nodes includes a root node and a plurality of parent nodes each containing d child nodes, and each child node being a child of a respective parent slot in each parent node and storing a key value greater than (max-heap) or smaller than (min-heap) a key value stored in the respective parent slot. The plurality of nodes of the heap comprises multiple levels including a root level and non-root levels. The array of slots in memory stores the nodes of the d-heap across the slots wherein the root-level is stored in the d slots at the beginning-most d slots of the array and the non-root levels are thereafter stored contiguously in the array. As a result, the d-heap is vectorized allowing the key values within the nodes to be stored contiguously in the array. From here, the vectorized d-heap employs horizontal aggregation SIMD instructions to minimize the number of comparisons needed for retrieval operations. Vectorized d-heaps are fully described in U.S. patent application Ser. No. 16/139,226, filed Sep. 24, 2018, the entire contents of which are hereby incorporated by reference as if fully set forth herein.

As an improvement of the vectorized d-heap, a generic vectorized d-heap comprises a prefix heap and a plurality of suffix heaps stored in a memory. Each suffix heap of the plurality of suffix heaps comprises a d-heap, which may be vectorized. Each key value of a plurality of key values is split into a key prefix value and a key suffix value. Key prefix values are stored in the prefix heap and key suffix values are stored in the plurality of suffix heaps. Each entry in the prefix heap includes a key prefix value of the plurality of key values and a reference to the suffix heap of the plurality of suffix heaps that includes all key suffix values of the plurality of key values that share the respective key prefix value. A prefix hash-table may be utilized to quickly obtain suffix d-heaps for a given prefix value. Generic vectorized d-heaps are fully described in U.S. patent application Ser. No. 16/399,226, filed on Apr. 30, 2019, the entire contents of which are hereby incorporated by reference as if fully set forth herein.

Both heap implementations have a superior retrieve performance but do not improve the insert performance, which is on par with the insert performance of regular d-heaps.

In an embodiment, techniques described herein delay heapify operations (e.g., operations to maintain heap property) until a retrieve operation, such as top( ) or pop( ), occurs to improve insert performance. Using these techniques, push( ) becomes a constant time operation. These techniques describe what is referred as a lazy push optimization. The optimization significantly improves insert performance of vectorized d-heaps that use horizontal aggregation SIMD instructions at the cost of slightly lower retrieve performance.

Lazy Push Optimization Overview

In an embodiment, the lazy push optimization may implement a 3-state strategy, which allows for constant-time push operations until the first retrieve operations. The 3-state strategy employs a vectorized full heapify. Alternatively, the lazy push optimization may implement a 4-state strategy, which allows for constant-time push operations over the lifetime of the heap. The 4-state strategy employs a vectorized partial heapify. Vectorized partial heapify restores heap property only for the keys that violate the heap property instead of for all keys.

Both implementations of the lazy push optimization
 use a novel way to check the state of the heap,
 have a low implementation complexity,
 work for arbitrary value of d, support payloads in the heap, support any data type supported by the vectorized d-heap, and do not require any additional space to buffer keys.

The lazy push optimization may be applied to all vectorized heaps that use horizontal aggregation SIMD instructions.

Comparison of Scalar Insert and Lazy Insert

In an embodiment, the push( ) method of the vectorized d-heap is optimized by employing a lazy heap maintenance strategy where the heap property is sometimes violated during the lifetime of the heap. Maintenance of the heap property is always delayed until the first retrieve operation (e.g., top( ) or pop( )) occurs. As such, insert operations become simple copy operations that work without any key comparisons. Retrieve operations check whether the heap property is currently violated and restore it when it is so and, only then, retrieve or access the top key. To reduce the performance impact on retrieve operations, vectorized methods are used to restore the heap property. The following FIGS. 5-7 illustrate how restoring the heap property can be optimized via SIMD instructions.

Figure 5:
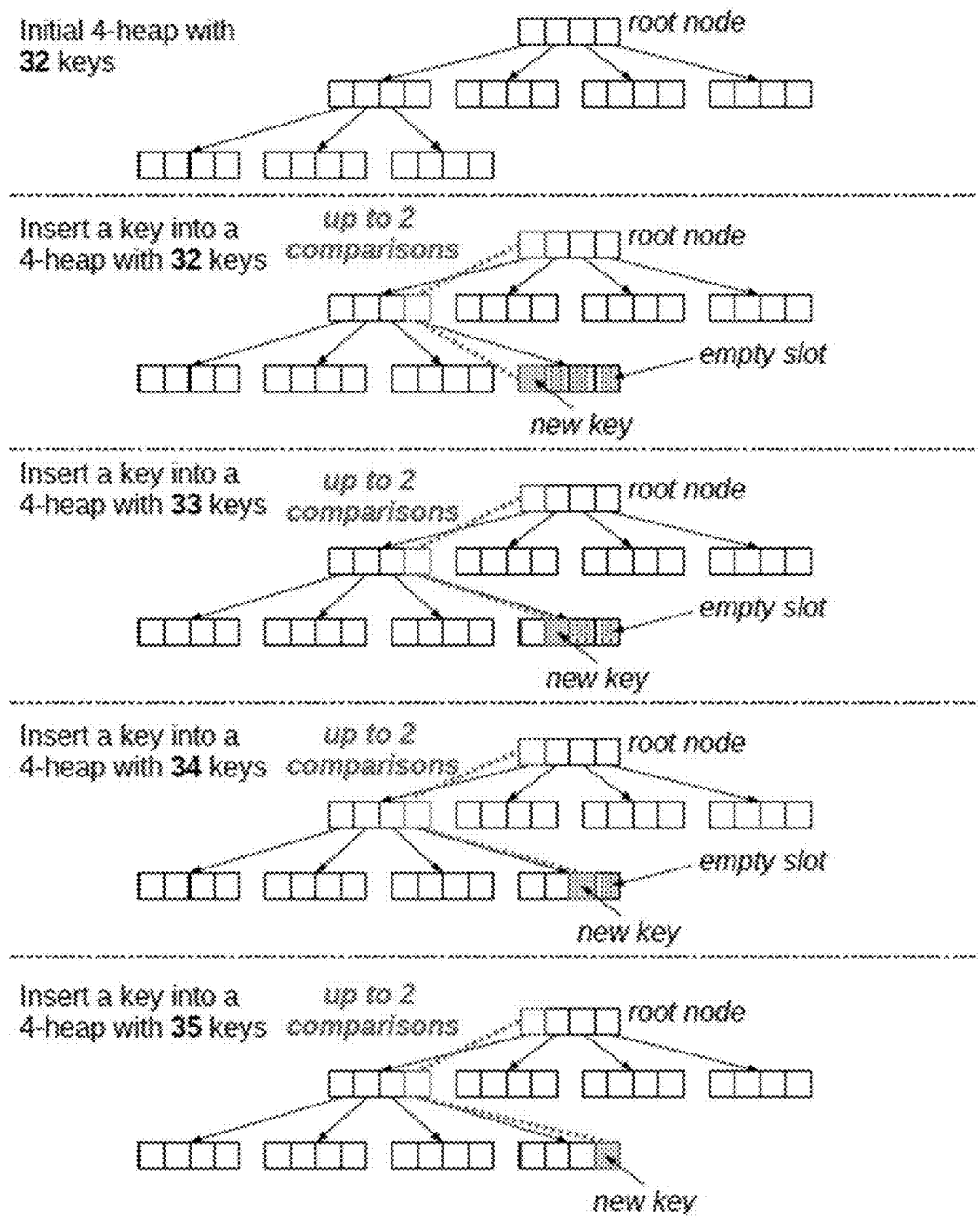
FIG. 5 illustrates a scalar insert of four keys into a 4-heap with 32 keys.

FIG. 5 illustrates how four keys are inserted into a 4-heap that has 32 keys, in a scalar or non-lazy manner. Initially, the heap has 8 nodes with each 4-slots filled with values. When the first of the four keys is inserted, a new node with 4 slots is created. The key is inserted into the first slot of the new node and up to two comparisons are needed to restore the heap property. One comparison is needed if the key does not need to be swapped with its respective parent node key and two comparisons are needed otherwise. The next three of the four keys are inserted into the same new node. Each key insertion requires either 1 or 2 comparisons. In total, at least four, and up to eight, comparisons are needed to insert the four keys.

Figure 6:
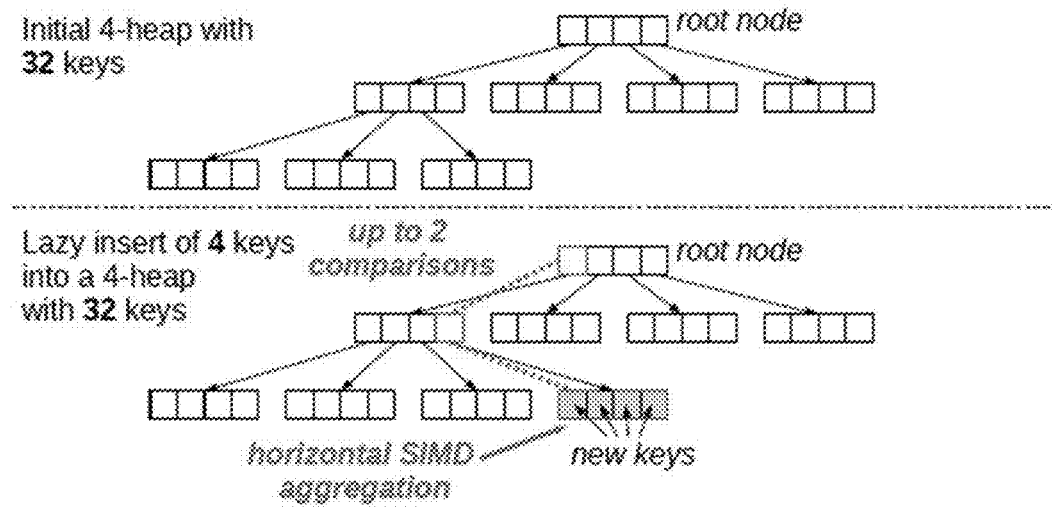
FIG. 6 illustrates a lazy insert of four keys into a 4-heap with 32 keys in an embodiment of the invention.

FIG. 6 illustrates the number of comparisons required when four keys are inserted lazily into a heap that has 32 keys. The heap has 8 nodes, each with 4 slots, and a new node is created when the first of the four keys is inserted. However, all four keys are inserted into the new node without restoring the heap property in between insertions. After copying all keys into the new node, only one horizontal aggregation is required to find the top element within it and up two regular comparisons are required to restore the heap property. Hence, roughly one-fourth the number comparisons are required when compared with scalarly or non-lazily insertion.

Figure 7:
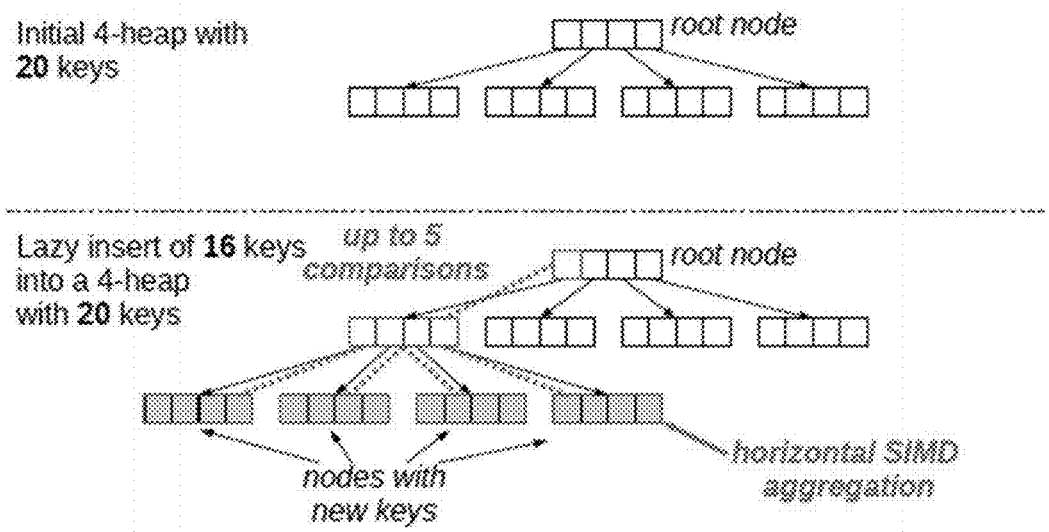
FIG. 7 illustrates a bulk insert of 16 keys into a 4-heap with 20 keys in an embodiment of the invention.

FIG. 7 illustrates the number of comparisons required when 16 keys are inserted lazily into a heap that has 20 keys. First, four new nodes are created, and 16 keys are copied into them. The heap property is then restored using 5 horizontal aggregations and 5 comparisons. Hence, only one comparison is required per 3 keys inserted into the heap.

Maintaining the heap lazily works very well because many algorithms that employ priority queues (e.g., graph algorithms) perform multiple insert operations until the first retrieve operation appears. In some algorithms, even the full heap is built until the first retrieve operations happens (e.g., top-k with large k). As discussed above, there are different lazy maintenance strategies for vectorized d-heaps, each of the which is discussed below.

3-State Lazy Push Heap with Full Heapify

In the 3-state lazy push strategy, the vectorized heap is always in of the three states: single-node heap, unordered, and heap. The heap starts with a single node in which values do not need to be ordered, as by the definition of the d-heap. As soon as the heap grows larger than d elements, it enters the unordered state. In the unordered state, values are simply copied into the heap's underlying memory whenever push( ) is called. Hence, the heap property is violated for all keys in the heap. As soon as the first retrieve operation occurs, the heap property is restored by building the heap from scratch via the method make_heap( ). From this point, all following calls to push( ) will maintain the heap property. The heap now behaves like a regular vectorized d-heap. The only way to get back to the unordered state is to remove all keys until the heap includes the root node only. Keys can start being inserted again.

Figure 8:
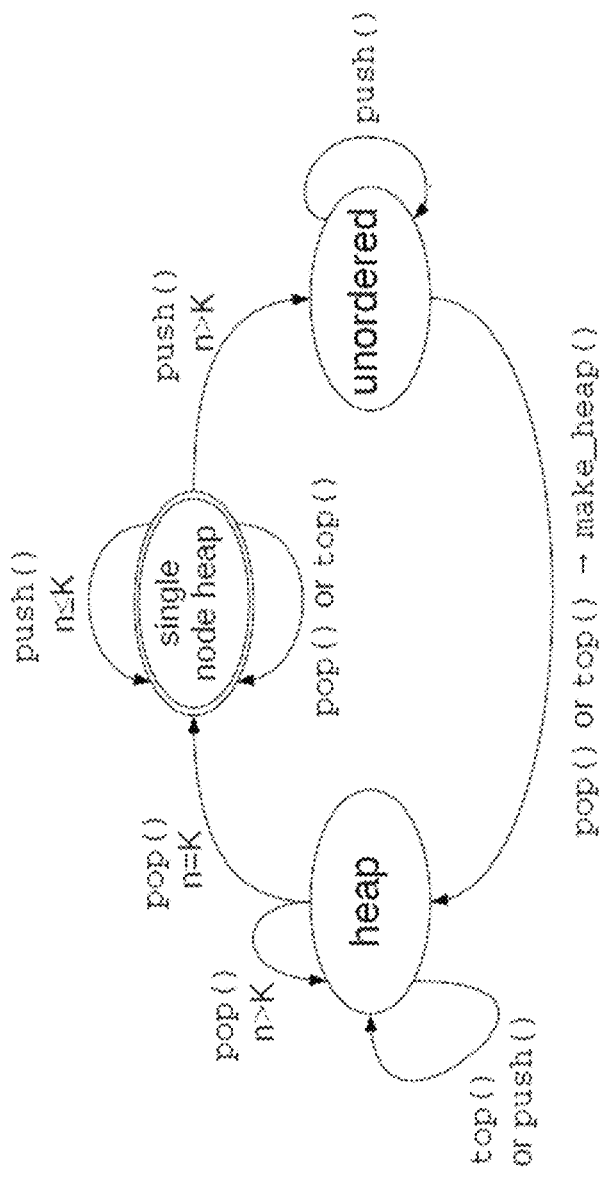
FIG. 8 illustrates a state diagram for a 3-state lazy push strategy in an embodiment of the invention.

FIG. 8 illustrates a state diagram for the 3-state lazy push strategy. The parameters K (number of elements per vector) and d (number of values per node) are used interchangeably herein since the size of a node is equal to the number of elements in a vector. In the single-node heap state, which is the heap's initial state, the heap has at most K elements in it. These K elements do not need to be ordered, since horizontal aggregation vector instructions may be used to obtain the smallest or largest from K elements. The heap stays in the single-node as long as after push( ), the number of elements does not increase over K. If the heap has already K elements and another element is added with push( ), then the heap transitions to the unordered state. It stays in the unordered state as long as no retrieve operation (e.g., pop( ) or top( )) is called. The heap state is reached from the unordered state after the first retrieve operation. The heap stays in this state as long as the heap has more than K elements. As soon as the heap has K or less elements, the single-node heap state is reached again.

Table 2 shows the pseudocode for the vectorized min-heap that uses horizontal aggregation SIMD instructions and has the lazy-push optimization enabled. The heap uses one extra variable is_heap, which indicates whether the heap's underlying array consists only of unsorted or unordered items (is_heap set to false) or all of the heap's items form an actual heap fulfilling the heap property (is_heap set to true). The heap implementation extends the basic vectorized heap and overwrites, aside from providing constructor and destructor, the three methods top( ), pop( ), and push( ). The top( ) method first checks if the items are unordered and if there are more than 8 items. If both conditions evaluate to true, the make_heap( ) method is called to form a heap from the heap's unordered items and the is_heap flag is set to true. There is small cost associated with evaluating the branch, however, it is negligible because the processor's branch prediction can likely well predict the outcome of the branch. In the remainder of the method, the top( ) method of the base class (e.g., the basic vectorized heap) is called unconditionally and its result is returned. The pop( ) method works analogously, however, it (re)sets the is_heap flag to false if the heap's number of items reaches 8 after calling the pop( ) method of the base class. Finally, the push( ) method either calls the regular push( ) method in case the items already form a heap or the append( ) method in case the items are stored unordered in the heap's data array. The append( ) method has a single parameter val, which contains the item that should be indexed in the heap. The method first checks whether there is enough memory to accommodate the new item. If there is not enough memory, the heap's memory is doubled by calling the grow( ) method. Thereafter, the item is stored at the last position within the data array that contains the heap's indexed items. Finally, the variable mysize, which stores the number of indexed items, is incremented by one.

TABLE 2

VECTORIZED REAP WITH LAZY PUSH OPTIMIZATION

```
class LazyPushUB2MinHeap : public UB2MinHeap {
  private:
    static const int K = 8;
    bool is_heap;
  public:
    LazyPushUB2MinHeap( ) : is_heap(false) { }
    ~LazyPushUB2MinHeap( ) { }
    unsigned short top ( ) {
      if (!is_heap && UB2MinHeap::size( ) > K) {
        UB2MinHeap::make_heap( );
        is_heap = true;
      }
      return UB2MinHeap::top( );
    }
    void pop ( ) {
      if ( !is_heap && UB2MinHeap::size ( ) > K) {
        UB2MinHeap::make_heap( );
        is_heap = true;
      }
      UB2MinHeap::pop( );
      if (UB2MinHeap: :size ( ) == K) {
        is_heap = false;
      }
    }
    void push (unsigned short val) {
      if (!is_heap)
        UB2MinHeap::push(val);
      else
        append(val);
    }
    void append (unsigned short val) {
      if(mysize == reserved) {
        grow ( );
      }
      data[mysize] = val;
      mysize ++;
    }
};
```

Table 3 shows the pseudocode for sift_down( ) and the mean_heap( ) methods, which are used in the methods in Table 2 and Table 5 (see below).

TABLE 3

Pseudocode for shift_down ( ) and make_heap ( )

```
int sift_down (int pos) {
  int has_swapped = false;
  int len = myunsorted;
  int child = (pos + 1) * K;
  while (child < len) {
    __m128i in = _mm_loadu_si128((__m128i*)&data[child]);
    __m128i res = _mm_minpos_epu16(in);
    if (_mm_extract_epi16(res, 0) < data[pos]) {
      child += _mm_extract_epi16(res, 1);
      swap(data[pos], data[child]);
      pos = child;
      child = (child + 1) * K;
      has_swapped = true;
    }
    else {
      break;
    }
  }
  return has_swapped;
}
void make_heap( ) {
  int len = myunsorted;
```

TABLE 3-continued

Pseudocode for shift_down ( ) and make_heap ( )

```
  for (int i = (len - 1) / K; i >= 0; --i) {
    sift_down(i) ;
  }
}
```

The sift_down( ) and the mean_heap( ) methods are fully described in U.S. patent application Ser. No. 16/299,483, filed on Mar. 12, 2019, the entire contents of which are hereby incorporated by reference as if fully set forth herein.

4-State Lazy Push Heap with Partial Heapify

In the 4-state lazy push strategy, the vectorized heap is always in of the four states: single-node heap, unordered, partial-ordered and heap. The strategy is an extension of the 3-state lazy push strategy, where the partial-ordered state allows to leave the heap state when the number of keys is larger than K. Whenever a key is inserted into the heap and it is in heap state, then it transitions into the partial ordered state. In this state, keys are simply copied (via append( )) as in the unordered state. With the first retrieve operation, the heap transitions from partial ordered to heap state. Here, the heap property has to be restored. Instead of rebuilding the full heap from scratch, make_partial_heap( ), which only rebuilds parts of the heap that need to be rebuild, is called.

Figure 9:
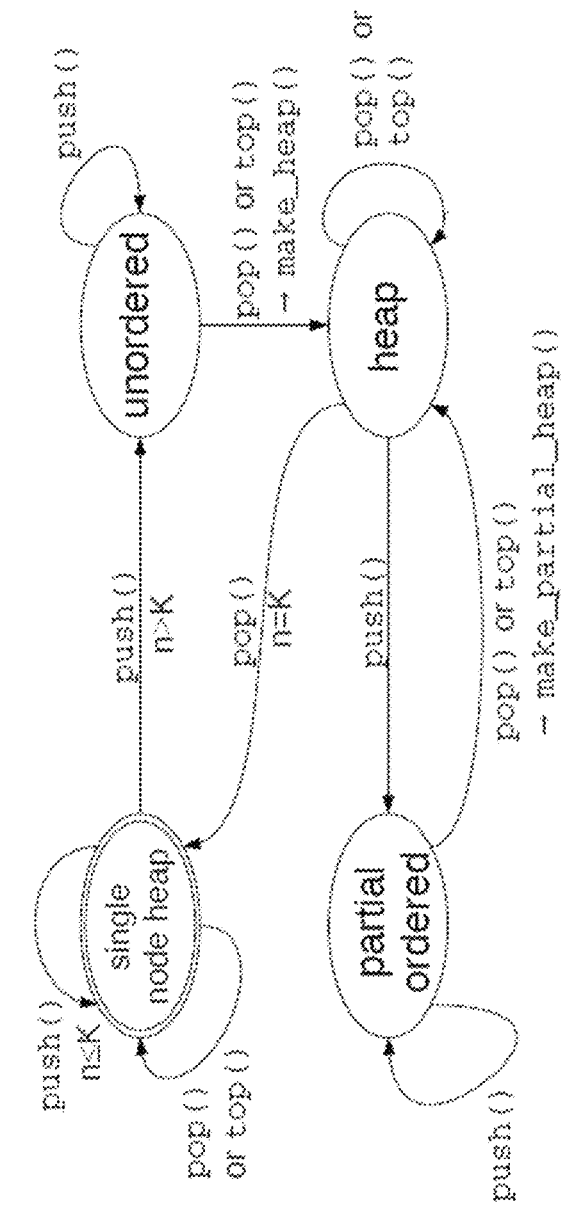
FIG. 9 illustrates a state diagram for a 4-state lazy push strategy in an embodiment of the invention.

FIG. 9 illustrates a state diagram for the 4-state lazy push strategy. The states single-node heap, unordered and heap behave exactly as in the 3-state lazy push strategy (FIG. 8). The partial-ordered state is reached from the heap state by inserting keys into the heap. The heap stays in this state as long as only push is called. The partial-ordered state is left as soon as a retrieve operation is called.

Table 4 shows the pseudocode for the methods of a vectorized heap that employs the 4-state lazy push strategy. The heap uses an additional variable unsorted, which marks the region in memory from which the values are not ordered anymore. All keys from 0 up to mysize are ordered, while values between mysize and unsorted are in the unordered region. The methods are similar to the methods of Table 2. The main difference is how the current heap state is determined. Whenever unsorted is equal to mysize, the heap is in heap state. Otherwise, it is in partial ordered state. In an embodiment, this implementation does not implement the states unordered and single-node directly. Instead, these states are observed whenever make_heap_partially( ) is called within top( ) or pop( ).

TABLE 4

Vectorized heap with advanced lazy push optimization

```
class LazyPushUMinHeap : public UMinHeap {
  protected:
    int myunsorted;
  public:
    LazyPushUMinHeap(HeapMemoryManager *_mm = NULL) :
      UMinHeap(_mm), myunsorted (0) { }
    ~LazyPushUMinHeap( ) { }
    unsigned short top( ) {
      if (mysize != myunsorted) {
        make_heap_partially( ) ;
      }
      return UMinHeap::top( );
    }
    void pop( ) {
      if (mysize != myunsorted) {
        make_heap_partially( ) ;
      }
```

TABLE 4-continued

Vectorized heap with advanced lazy push optimization

```
        UMinHeap::pop( );
        myunsorted--;
    }
    void push(unsigned short val) {
        if (myunsorted == reserved) {
            grow( );
        }
        data[myunsorted] = val;
        myunsorted ++;
    }
    size_t size ( ) const {
        return myunsorted;
    }
    bool empty( ) const {
        return myunsorted == 0;
    }
    int sift_down(int pos);
    void make_heap( )
};
```

Table 5 shows the pseudocode for the method make_heap_partially( ). The method make_heap_partially( ) is called from inside the pop( ) and top( ) method whenever these functions are called and there is an unordered region in the heap. The method first checks if the overall number of elements is smaller or equal to K. In this case, there is no need to build the heap and the method simply returns because there is only one node and the elements within a node do not need to be ordered. If there are more than K elements in the heap, it is checked to determine if there is already a sorted region. In case there is no sorted region, the make_heap( ) method (Table 3) is called to build the heap from scratch. The make_heap( ) method (Table 3) is also called if a partial rebuild would amount to building the heap fully, e.g., if the heap's underlying tree has complete level of newly added elements. Otherwise, the heap is partially built by only reordering the values in the unordered region until the heap is build. Partially rebuilding basically calculates which range of nodes in each level of the d-heap's underlying tree have to be maintained. It starts with the lowest level and moves up until it reaches the root level, e.g., root node. As an optimization, it stops moving upwards as soon as no value has been swapped in the current iteration. When this happens, the heap property is restored.

TABLE 5

Pseudocode for make_heap_partially ( )

```
void LazyPushUMinHeap::make_heap_partially( ) {
    if (myunsorted <= K)
        return;
    int ls = mysize / K - 1;
    int rs = myunsorted / K - 1;
    if (mysize == 0 | | (rs / K - 1) > ls) {
        // there is no heap so far or partial rebuild requires
        // the same number of sift-downs as make_heap
        // ->build the heap from scratch
        make_heap( );
    }
    else {
        // build the heap only partially
        int has_swapped = false;
        while (rs >= 0) {
            ls = ls >= 0 ? ls: 0;
            for (int i = rs; i >= ls; i--) {
                has_swapped | = sift_down(i);
            }
            if (!has_swapped ) break;
            rs = rs / K - 1;
```

TABLE 5-continued

Pseudocode for make_heap_partially ( )

```
            rs = rs < ls ? rs: ls;
            ls = ls / K - 1;
        }
    }
    mysize = myunsorted;
}
```

Process Overview

Figure 10A:
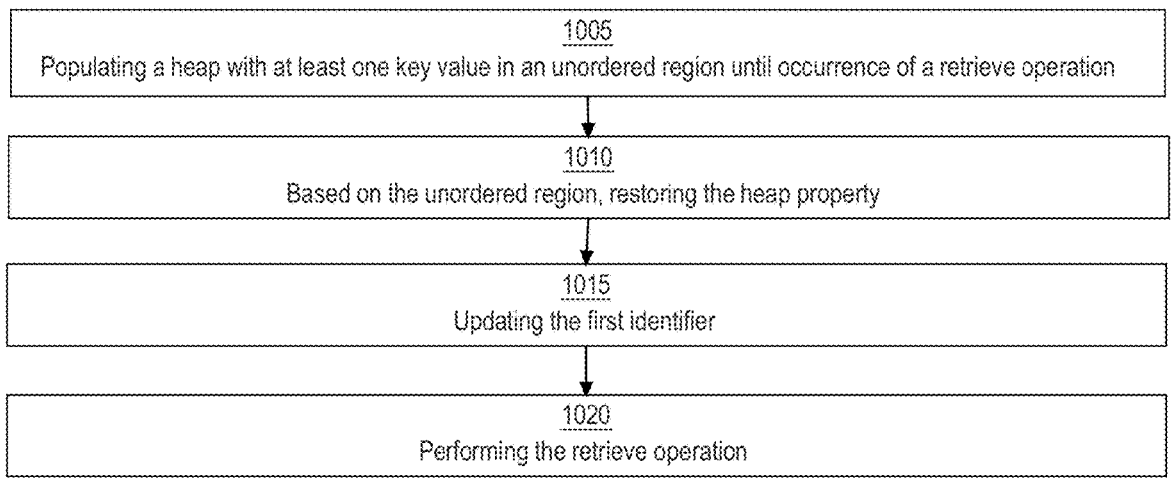
FIGS. 10A-10C illustrate a flow diagram that depicts a lazy push process in an embodiment of the invention.
Figure 10B:
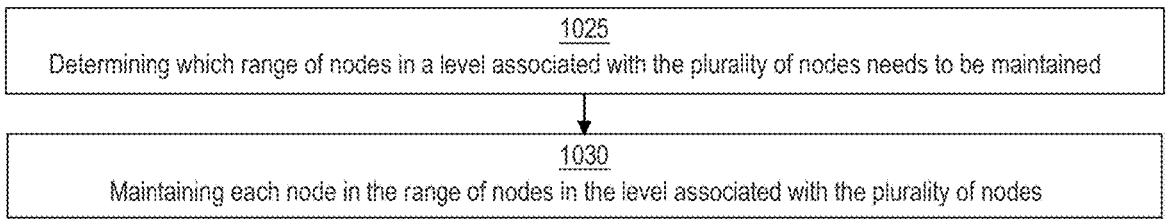
Figure 10C:
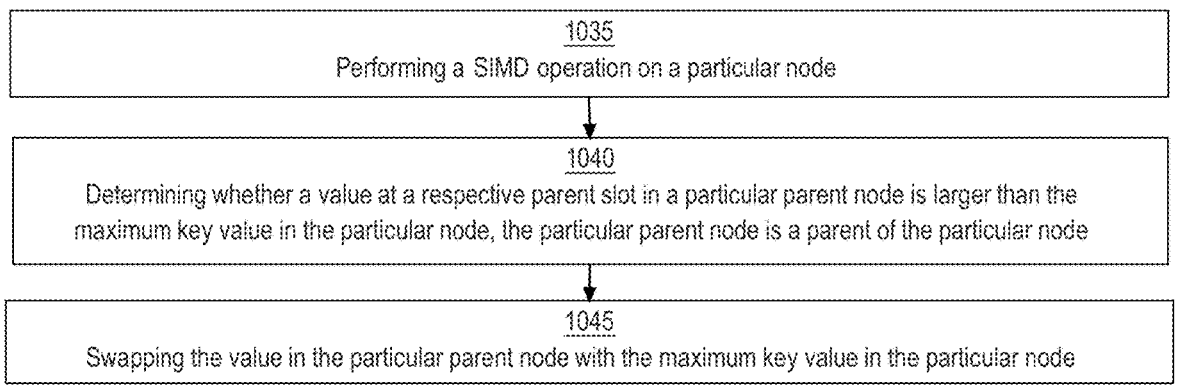

FIGS. 10A-10C illustrate a flow diagram that depicts a lazy push process 1000 in an embodiment of the invention. The process 1000 may be performed in any processor containing vector instruction sets. For example, the x86 processor architecture allows the instructions to operate on an independent register set including registers, which contain eight 16-bit values being compared. The process 1000 allows for constant-time push operations until the first retrieve operation and restores the heap property for key values that violate it. The process 1000 reorders the key values based on largest values (max-heap). However, it will be appreciated that the method 1000 can be performed to reorder the key values based on smallest values (min-heap).

Referring to FIG. 10A, at step 1005, a heap is populated with at least one key value in an unordered region until occurrence of a retrieve operation. In an embodiment, a first identifier identifies the first key value of the at least one key value and a second identifier identifies the last key value of the at least one key value populated in the unordered region. The second identifier is updated each time a key value is populated in the heap. All key values from 0 up to the first identifier are ordered while key values between the first identifier and the second identifier are unordered.

The heap includes a plurality of nodes. Each node of the plurality of nodes comprises d slots, d being a whole number greater than one, wherein the d slots of a respective node are stored contiguously within a memory address space of memory. The plurality of nodes includes a root node and a plurality of parent nodes, each parent node of the plurality of parent nodes having d child nodes, each child node of the d child nodes being a child of a parent slot in a respective parent node. The plurality of nodes is associated with a plurality of levels, including a root level containing the root node.

Step 1005 allows for constant time push operations until the occurrence of a retrieve operation and, thus, may violate heap property. Restoring the heap property is delayed until occurrence of a retrieve operation. Example retrieve operation is a top( ) or a pop( ).

In response to the retrieve operation, at step 1010, based on the unordered region, the heap property is restored. In an embodiment, the heap property is restored only for key values in the heap that violate the heap property. The key values in the heap that violate the heap property may include at least the key values in the unordered region. FIG. 10B illustrates example steps of restoring the heap property for the key values in the heap that violate the heap property.

Referring to FIG. 10B, at step 1025, it is determined which range of nodes in a level associated with the plurality of nodes needs to be maintained. At step 1030, each node in the range of nodes in the level associated with the plurality of nodes, is maintained. Steps 1025 and 1030 are iterated for each level associated the plurality of nodes, starting from the lowest level associated with the plurality of nodes and moving up until the root level associated with the plurality of nodes is reached or until no key value has been swapped in the current iteration. When the iterations stop, the heap property is restored. FIG. 10C illustrates example steps of maintaining a node.

Referring to FIG. 10C, steps 1035-1045 are performed for each node in the range of nodes determined at step 1025 of FIG. 10B. At step 1035, a SIMD operation is performed on a particular node. The SIMD operation uses horizontal SIMD instructions. In an embodiment, performing the SIMD operation on the particular node generates a maximum key value and an index of a slot in the particular node that holds the maximum key value. Alternatively, performing the SIMD operation on the particular node generates a minimum key value and an index of a slot in the particular node that holds the minimum key value.

At step 1040, it is determined whether a value at a respective parent slot in a particular parent node, the particular parent node being the parent of the particular node, is larger than the maximum key value in the particular node.

At step 1045, in response to determining that the value in the particular parent node is larger than the maximum key value in the particular node, the value in the particular parent node is swapped with the maximum key value in the particular node.

Returning to FIG. 10A, after step 1010, the heap property is restored. At step 1015, the first identifier is updated. The first identifier is set to the second identifier. The unordered region now has no unordered key values since there are no key values in the unordered region (e.g., no key values between the first identifier and the second identifier).

At step 1020, the retrieve operation is performed. The retrieve operation retrieves or accesses the top key value. If the retrieve operation is a pop( ), then step 1020 removes the top key value from the heap (e.g., from the root node). If the retrieve operation is a top( ), then step 1020 returns the top key value of the heap (e.g., from the root node).

In an embodiment, after step 1020, the method 1000 continues by performing one or more subsequent retrieve operations until occurrence of a push operation. In response to the push operation, the heap is populated with another key value in the unordered region.

In an embodiment, after the step 1020, the method 1000 continues by populating the heap with one or more subsequent key values in the unordered region until occurrence of another retrieve operation. As before, the second identifier is updated each time a key value is populated in the heap. In response to the another retrieve operation, steps 1010-1020 of FIG. 10A are repeated.

FIG. 10D illustrates an example 1050 depicting lazy push for a vectorized d-heap in an embodiment of the invention. In the example 1050, d=4 and key values are to be ordered based on largest values (max-heap). Key values are continuously pushed or inserted into a heap until occurrence of a retrieve operation.

Key values 12, 34, 7, 67, 4, 100, 43, 41, 26, 86, 84, and 42 are inserted using constant-time push operations. A first identifier and a second identifier, shown as ↓, and ↑, respectively, in FIG. 10D, defines an unordered region. The unordered region includes inserted key values that have not yet been ordered and that may violate the heap property. The first identifier ↓ identifies key value 12 as being the first key value in the unordered region and the second identifier ↑ identifies key value 42 as the last key value in the unordered region.

There are two levels associated with the inserted key values: one root level and one non-root level, which is currently the lowest level associated with the inserted key values. The root level includes root node (Node A) having the key values 12, 34, 7, and 67. The non-root level includes two child nodes. The first child node (Node B) has the key values 4, 100, 43, and 41. The second child node (Node C) has the key values 26, 86, 84, and 42. Each slot of a node and its corresponding child node are both indicated by the same indicator (e.g., horizontal lines, left diagonal lines, vertical lines, right diagonal lines). For example, the child node of the first root slot (holding key value 12) of the root node is Node B. For another example, the child node of the second root slot (holding key value 34) of the root node is Node C.

As described above, the inserted key values may violate the heap property, because maintaining the heap property is delayed until occurrence of a retrieve operation. In the example 1050, the heap property is violated because Node B and Node C contain key values (e.g., 100 and 86, respectively) that are larger than the key values contained in their parent node, Node A.

In response to the retrieve operation, the key values in the unordered region is reordered until the heap property is satisfied. A range of nodes in each level of the d-heap that needs to be maintained is determined, starting with the lowest level and moving up until the root level or as soon as no value has been swapped in the current iteration. When this happens, the heap property is restored.

In the example 1050, Node B and Node C are in the lowest level that need to be maintained because their corresponding key values are in the unordered region. The key values in each node may be stored as a vector in a register. A SIMD operation may be used to find the key value and position of the largest vector value for Node B. The key value 100 of Node B is larger than the key value 12 of the parent slot of Node A corresponding to Node B. The key value 100 of Node B is swapped with the key value 12 of Node A. Similarly, a SIMD operation may be used to find the key value and position of the largest vector value for Node C. The key value 86 of Node C is larger than the key value 34 of the parent slot of Node A corresponding to Node C. The key value 86 of Node C is swapped with the key value 34 of Node A. Since the root level is the next level to process, the heap property is restored. The first identifier ↓ is updated by setting the first identifier ↓ to the second identifier ↑. The retrieve operation retrieves or access the top key value of the heap.

Assume new key values 52, 53, 72, 123, 1, 37, 44, and 51 are then inserted using constant-time push operations. The first identifier ↓ identifies key value 52 as being the first key value in the unordered region and the second identifier ↑ identifies key value 51 as the last key value in the unordered region.

There are still currently two levels associated with the inserted key values: one root level and one non-root level, which is currently the lowest level associated with the inserted key values. The root level includes the root node (Node A) now having the key values 100, 86, 7, and 67. The non-root level includes two previous child nodes and two new child nodes. A previous child node (Node B) now has the key values 4, 12, 43, and 41. Another previous child node (Node C) now has the key values 26, 34, 84, and 42. A new child node (Node D) has the key values 52, 53, 72, and 123. Another new child node (Node E) has the key values 1, 37, 44, and 51. Each slot of a node and its corresponding child node are both indicated by the same indicator (e.g., horizontal lines, left diagonal lines, vertical lines, right diagonal lines). For example, the child node of the first root slot (holding key value 100) of the root node is Node B. For another example, the child node of the second root slot (holding key value 86) of the root node is Node C. For yet another example, the child node of the third root slot (holding key value 7) of the root node is Node D. For yet another example, the child node of the fourth root slot (holding key value 67) of the root node is Node E.

In the example 1050, Node D and Node E are in the lowest level that need to be maintained because their corresponding key values are in the unordered region. Node B and Node C in the lowest level do not need to be maintained because the key values associated with the Node B and Node C are in the ordered region (e.g., not within the unordered region). A SIMD operation may be used to find the key value and position of the largest vector value for Node D. The key value 123 of Node D is larger than the key value 7 of the parent slot of Node A corresponding to Node D. The key value 123 of Node D is swapped with the key value 7 of Node A. Similarly, a SIMD operation may be used to find the key value and position of the largest vector value for Node E. No key values need to be swapped because the heap property is not violated for Node E. Since the root level is the next level to process, the heap property is restored. The first identifier ↓ is updated by setting the first identifier ↓ to the second identifier ↑. The retrieve operation retrieves or accesses the top key value of the heap.

Benefits and Advantages

Several experiments were conducted, showing that the lazy push optimization significantly improves the insert performance of vectorized d-heaps. The following describes the setup and outcome of these experiments.

The experiments were conducted on a system that includes an Intel i3-8121U CPU with a core frequency of up to 3.20 GHz and 8 GB of main memory. The operating system used is Linux (kernel version 4.4.0). The algorithms are implemented in C++ and were compiled using GCC 5.4.0.

The following four implementations are compared:
1. a vectorized d-heap without the lazy push optimization,
2. a lazy-push vectorized d-heap that has the lazy push optimization enabled,
3. a scalar d-heap, and
4. the highly optimized std::priority queue implementation of the C++ standard template library.

For generic vectorized d-heap implementation, d was set to 8. Before each experiment, uniform random values were generated and stored within an array. To avoid memory allocation during the experiment, shrinking of the heaps was disabled and a warmup round without measuring times was ran.

Multiple experiments were ran, in which heaps with 128 thousand keys were created. Each run was repeated 32 times and the average runtime of these 32 runs is reported. Two different sets of experiments were ran.

In the first set of experiments, in each iteration, 128 thousand keys were pushed into the heap under test and thereafter top( ) followed pop( ) were called until the heap was empty again. Thus, the number of calls to push( ) is the same as the number of calls to pop( ).

In the second set of experiments, in each iteration, 128 thousand keys were pushed into the heap under test but only retrieved 20% of the values afterwards using top( ) and pop( ). Retrieving only a certain percentage of keys during the lifetime of a heap resembles the behavior of various algorithms. For example, shortest path graph algorithms often insert much more keys into the heap than they retrieve because they stop retrieving keys as soon as the shortest path is found.

Figure 11:
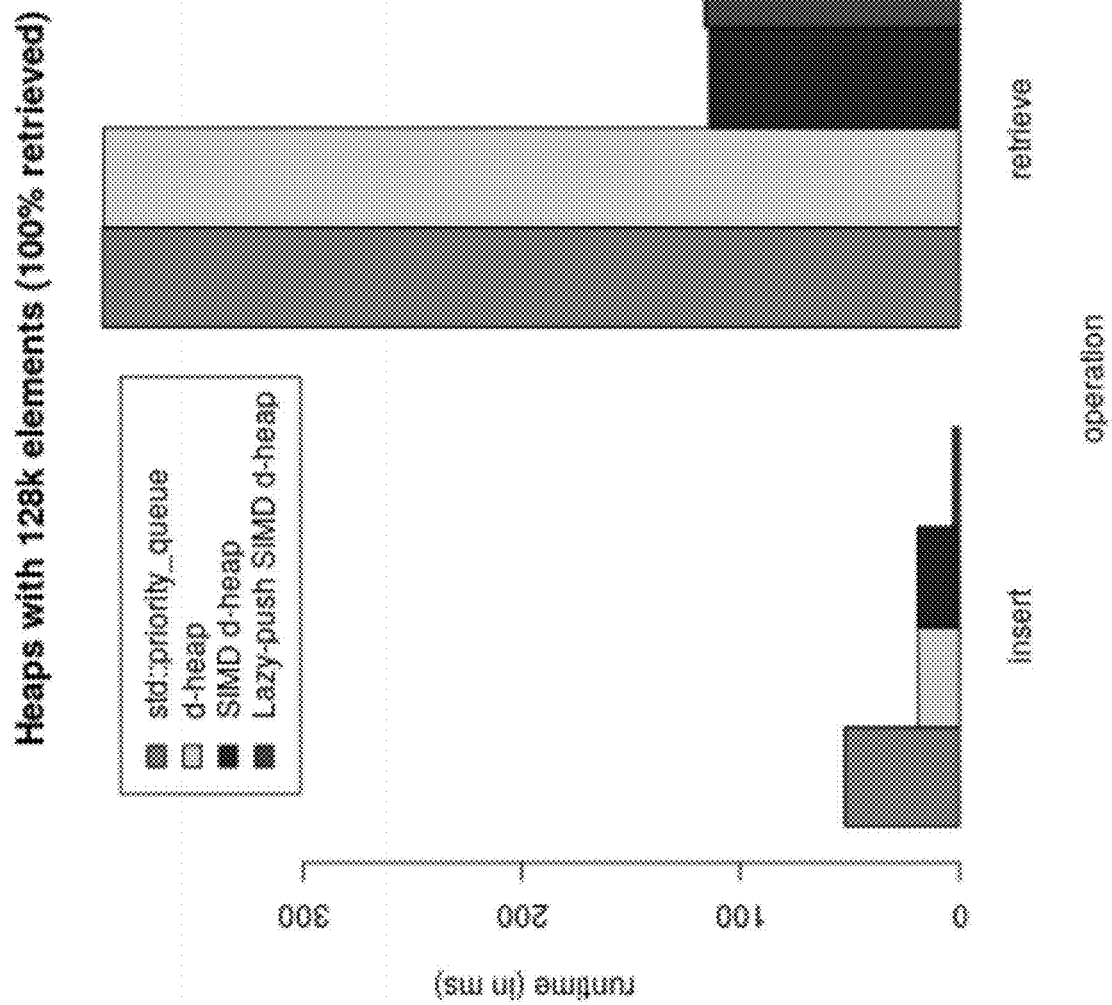
FIG. 11 illustrates a graph depicting insert and retrieve performance for heaps with varying sizes.

Performance with full retrieval. FIG. 11 shows the results for the first set of experiments where, in each iteration, all keys that have been inserted into the heap under test were retrieved. As can be seen, the vectorized d-heap without the lazy push optimization and the regular d-heap have the same insert performance because they share the same implementation of the push( ) method. Insert for both implementations is about 2.7× faster than for the std::priority_queue implementation. The insert performance of the vectorized d-heap that uses the lazy-push optimization, however, is 5.3× faster compared to the regular d-heap and the vectorized d-heap without lazy push. Compared to the std::priority_queue implementation, the vectorized d-heap with lazy push has a 14.6× better insert performance. Enabling the lazy push optimization leads to a small overhead for retrieve operations because maintaining the heap is performed during retrieve. A similar insert and retrieve performance for heaps with different sizes is observed.

Figure 12:
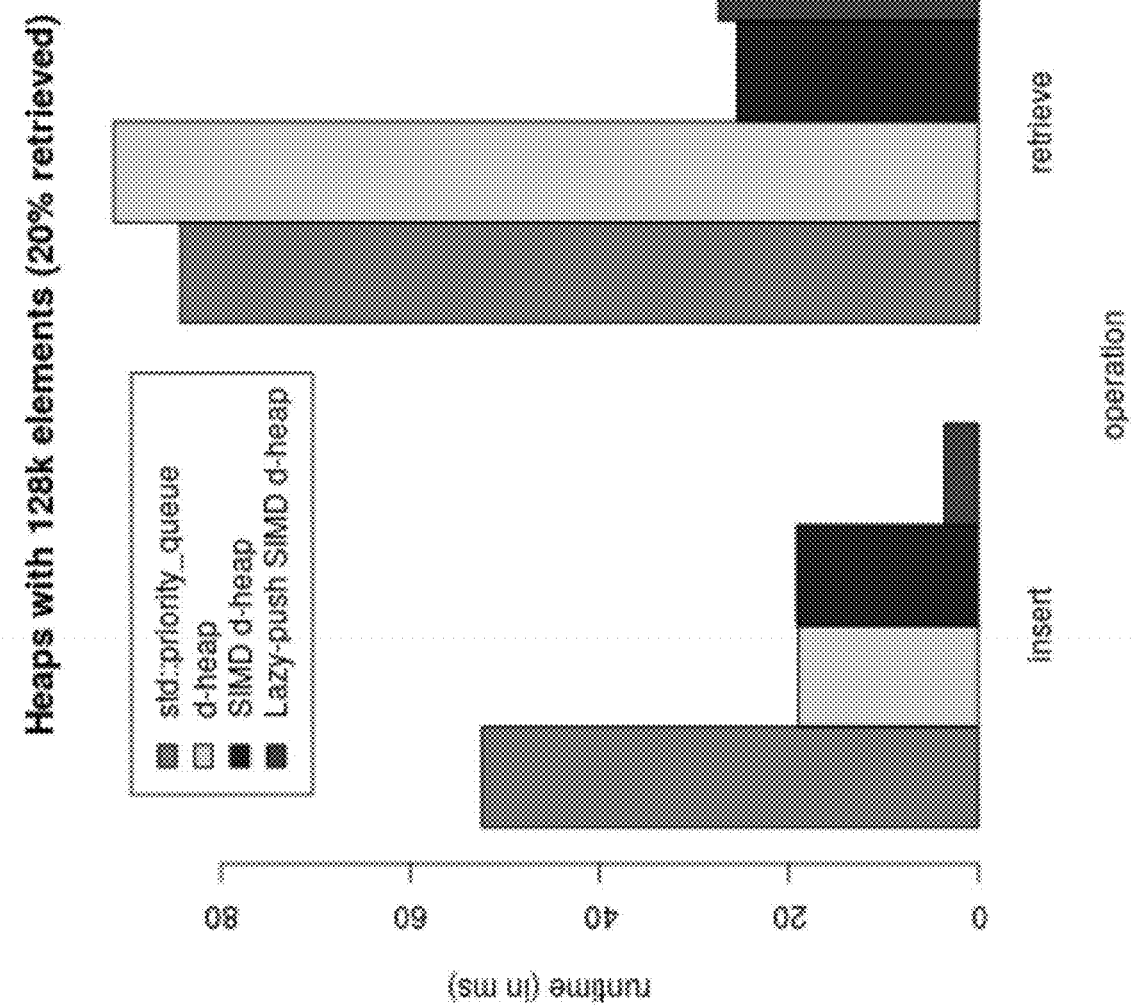
FIG. 12 illustrates another graph depicting insert and retrieve performance for heaps with varying sizes.

Performance with partial retrieval. FIG. 12 shows the results for the second set of experiments where, in each iteration, only 20% of the keys that have been inserted into the heap under test were retrieved. As can been seen, the relative performance for insert as well as for retrieve of all four implementations is the same as in the previous set of experiments. However, the total time for retrieving the keys is roughly only ⅕-th compared to the time required to retrieve all keys from the heaps. Hence, the time required for inserting keys has a much higher impact during the lifetime of the heap. Again, the vectorized d-heap with lazy push is 14.6× faster than the std::priority_queue and 5.3× faster than the regular d-heap and the vectorized d-heap that does not have lazy push enabled. The overhead for maintaining the heap during retrieve for the lazy-push vectorized d-heap is slightly higher when only 20% of the keys are retrieved compared to full retrieval because the time for building and maintained is amortized over less retrieve operations. It is still negligible and outweighed by the significantly better insert performance.

Applications

The described techniques may be implemented in a vast number of applications/products. All programs and algorithms that employ heaps (e.g., top-k operators, graph algorithms) or heap-based priority queues (e.g., used within scheduling) may benefit from these techniques. Algorithms where the heap or the priority queue itself is responsible for a large fraction of an algorithm's overall runtime (e.g., top-k search, shortest path graph searches) would significantly benefit if their heap implementation is exchanged with the described vectorized lazy d-heap implementation.

The described techniques may further be integrated into data structures and functions provided by various language libraries (e.g., priority_queue of the C++ standard template library, PriorityQueue in Java). All programs using these data structures of these libraries would then automatically benefit from the described techniques. Similarly, the described techniques may be integrated as a rule in just-in-time compliers, which then could detect and rewrite heap implementations during the runtime of a program. Even if the performance improvements are limited in many programs, the cumulated performance improvements of the vast number of programs that benefit of the describe techniques is substantial.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
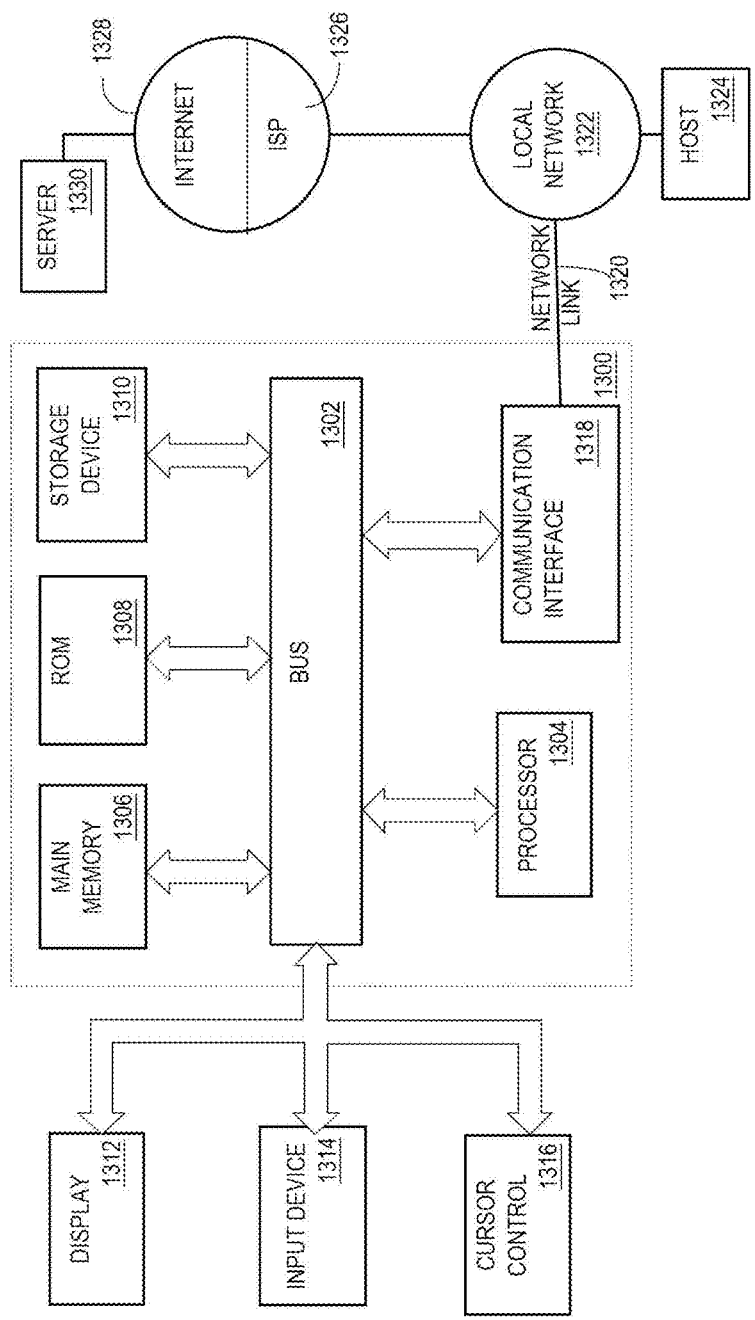
FIG. 13 illustrates a diagram depicting a computer system that may be used in an embodiment of the present invention.

For example, FIG. 13 is a block diagram that illustrates a computer system 1300 upon which an embodiment of the disclosure may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the worldwide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

Software Overview

FIG. 14 is a block diagram of a software system 1400 that may be employed for controlling the operation of computer system 1300. Software system 1400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1400 is provided for directing the operation of computer system 1300. Software system 1400, which may be stored in system memory (RAM) 1306 and on fixed storage (e.g., hard disk or flash memory) 1310, includes a kernel or operating system (OS) 1410.

The OS 1410 manages low-level aspects of computer operation, including managing execution of processes, memory allocation, file input and output (I/O), and device I/O. One or more application programs, represented as 1402A, 1402B, 1402C . . . 1402N, may be "loaded" (e.g., transferred from fixed storage 1310 into memory 1306) for execution by the system 1300. The applications or other software intended for use on system 1300 may also be stored as a set of downloadable computer-executable instructions, for example, for downloading and installation from an Internet location (e.g., a Web server, an app store, or other online service).

Software system 1400 includes a graphical user interface (GUI) 1415, for receiving user commands and data in a graphical (e.g., "point-and-click" or "touch gesture") fashion. These inputs, in turn, may be acted upon by the system 1400 in accordance with instructions from operating system 1410 and/or application(s) 1402. The GUI 1415 also serves to display the results of operation from the OS 1410 and application(s) 1402, whereupon the user may supply additional inputs or terminate the session (e.g., log off).

OS 1410 can execute directly on the bare hardware 1420 (e.g., processor(s) 1304) of system 1400. Alternatively, a hypervisor or virtual machine monitor (VMM) 1430 may be interposed between the bare hardware 1420 and the OS 1410. In this configuration, VMM 1430 acts as a software "cushion" or virtualization layer between the OS 1410 and the bare hardware 1420 of the system 1300.

VMM 1430 instantiates and runs one or more virtual machine instances ("guest machines"). Each guest machine comprises a "guest" operating system, such as OS 1410, and one or more applications, such as application(s) 1402, designed to execute on the guest operating system. The VMM 1430 presents the guest operating systems with a virtual operating platform and manages the execution of the guest operating systems.

In some instances, the VMM 1430 may allow a guest operating system to run as if it is running on the bare hardware 1420 of system 1300 directly. In these instances, the same version of the guest operating system configured to execute on the bare hardware 1420 directly may also execute on VMM 1430 without modification or reconfiguration. In other words, VMM 1430 may provide full hardware and CPU virtualization to a guest operating system in some instances.

In other instances, a guest operating system may be specially designed or configured to execute on VMM 1430 for efficiency. In these instances, the guest operating system is "aware" that it executes on a virtual machine monitor. In other words, VMM 1430 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

What is claimed is:
1. A method comprising:
 populating a heap with at least one key value in an unordered region of memory until occurrence of a retrieve operation,
 wherein the unordered region of memory is defined by a first identifier and a second identifier,
 wherein the first identifier identifies a first key value of the at least one key value and a second identifier identifies a last key value of the at least one key value populated in the unordered region of memory,
 wherein populating the heap violates a heap property,
 wherein the heap comprises a plurality of nodes,
 wherein each node of the plurality of nodes comprises d slots, d being a whole number greater than one, wherein the d slots of a respective node are stored contiguously within a memory address space of memory,
 wherein the plurality of nodes includes a root node and a plurality of parent nodes, each parent node of the plurality of parent nodes having d child nodes, each child node of the d child nodes being a child of a parent slot in a respective parent node; and
 in response to the retrieve operation:
  based on the unordered region of memory, restoring the heap property,
  updating the first identifier, and
  performing the retrieve operation.

2. The method of claim 1, wherein the retrieve operation is a top operation or a pop operation.

3. The method of claim 1, wherein populating the heap with the at least one key value comprises updating the second identifier.

4. The method of claim 1, wherein restoring the heap property comprises:
determining which range of nodes in a level associated with the plurality of nodes needs to be maintained;
maintaining each node in the range of nodes in the level associated with the plurality of nodes.

5. The method of claim 4, wherein maintaining each node in the range of nodes comprises:
performing a SIMD operation on a particular node,
wherein performing the SIMD operation on the particular node generates a maximum key value and an index of a slot in the particular node that holds the maximum key value;
determining whether a value at a respective parent slot in a particular parent node is larger than the maximum key value in the particular node, wherein the particular parent node is a parent of the particular node;
in response to determining that the value in the respective parent slot of the particular parent node is larger than the maximum key value in the particular node, swapping the value in the respective parent slot of the particular parent node with the maximum key value in the particular node.

6. The method of claim 4, wherein restoring the heap property further comprises repeating determining which range of nodes in the level associated the plurality of nodes needs to be maintained and maintaining each node in the range of nodes for each level associated with the plurality of nodes, starting from a lowest level associated with the plurality of nodes and moving up until a root level associated with the plurality of nodes is reached or until no key value has been swapped in a current iteration.

7. The method of claim 1, wherein updating the first identifier comprises setting the first identifier to the second identifier.

8. The method of claim 1, further comprising, after performing the retrieve operation, continuously performing a subsequent retrieve operation until occurrence of a push operation.

9. The method of claim 8, further comprising, in response to the push operation, populating the heap with another key value in the unordered region of memory.

10. The method of claim 1, further comprising, after performing the retrieve operation, continuously populating the heap with a subsequent key value in the unordered region of memory until occurrence of another retrieve operation.

11. One or more non-transitory storage media storing sequences of instructions which, when executed by one or more processors, cause:
populating a heap with at least one key value in an unordered region of memory until occurrence of a retrieve operation,
wherein the unordered region of memory is defined by a first identifier and a second identifier,
wherein the first identifier identifies a first key value of the at least one key value and a second identifier identifies a last key value of the at least one key value populated in the unordered region of memory,
wherein populating the heap violates a heap property,
wherein the heap comprises a plurality of nodes,
wherein each node of the plurality of nodes comprises d slots, d being a whole number greater than one, wherein the d slots of a respective node are stored contiguously within a memory address space of memory,
wherein the plurality of nodes includes a root node and a plurality of parent nodes, each parent node of the plurality of parent nodes having d child nodes, each child node of the d child nodes being a child of a parent slot in a respective parent node; and
in response to the retrieve operation:
based on the unordered region of memory, restoring the heap property,
updating the first identifier, and
performing the retrieve operation.

12. The one or more non-transitory storage media of claim 11, wherein the retrieve operation is a top operation or a pop operation.

13. The one or more non-transitory storage media of claim 11, wherein populating the heap with the at least one key value comprises updating the second identifier.

14. The one or more non-transitory storage media of claim 11, wherein restoring the heap property comprises:
determining which range of nodes in a level associated with the plurality of nodes needs to be maintained;
maintaining each node in the range of nodes in the level associated with the plurality of nodes.

15. The one or more non-transitory storage media of claim 14, wherein maintaining each node in the range of nodes comprises:
performing a SIMD operation on a particular node,
wherein performing the SIMD operation on the particular node generates a maximum key value and an index of a slot in the particular node that holds the maximum key value;
determining whether a value at a respective parent slot in a particular parent node is larger than the maximum key value in the particular node, wherein the particular parent node is a parent of the particular node;
in response to determining that the value in the respective parent slot of the particular parent node is larger than the maximum key value in the particular node, swapping the value in the respective parent slot of the particular parent node with the maximum key value in the particular node.

16. The one or more non-transitory storage media of claim 14, wherein restoring the heap property further comprises repeating determining which range of nodes in the level associated the plurality of nodes needs to be maintained and maintaining each node in the range of nodes for each level associated with the plurality of nodes, starting from a lowest level associated with the plurality of nodes and moving up until a root level associated with the plurality of nodes is reached or until no key value has been swapped in a current iteration.

17. The one or more non-transitory storage media of claim 11, wherein updating the first identifier comprises setting the first identifier to the second identifier.

18. The one or more non-transitory storage media of claim 11, wherein the sequences of instructions which, when executed by one or more processors, further cause, after performing the retrieve operation, continuously performing a subsequent retrieve operation until occurrence of a push operation.

19. The one or more non-transitory storage media of claim 18, the sequences of instructions which, when executed by one or more processors, further cause, in response to the push operation, populating the heap with another key value in the unordered region of memory.

20. The one or more non-transitory storage media of claim 11, the sequences of instructions which, when executed by one or more processors, further cause, after performing the retrieve operation, continuously populating the heap with a subsequent key value in the unordered region of memory until occurrence of another retrieve operation.

\* \* \* \* \*